US012269182B2

(12) United States Patent
Mulder et al.

(10) Patent No.: US 12,269,182 B2
(45) Date of Patent: Apr. 8, 2025

(54) PERSONAL CARE SYSTEM INCLUDING A PERSON CARE DEVICE DRIVE UNIT AND MULTIPLE FUNCTIONAL UNITS

(71) Applicant: KONINKLIJKE PHILIPS N.V., Eindhoven (NL)

(72) Inventors: Bernardo Arnoldus Mulder, Dronrijp (NL); Joost Willem Frederik Nengerman, Groningen (NL); Renger Ypenburg, Eelderwolde (NL); Johan Bron, Augustinausga (NL); Peter Sofrides Viet, Ureterp (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 264 days.

(21) Appl. No.: 17/299,095

(22) PCT Filed: Aug. 14, 2020

(86) PCT No.: PCT/EP2020/072824
§ 371 (c)(1),
(2) Date: Jun. 2, 2021

(87) PCT Pub. No.: WO2021/032604
PCT Pub. Date: Feb. 25, 2021

(65) Prior Publication Data

US 2022/0184831 A1 Jun. 16, 2022

(30) Foreign Application Priority Data

Aug. 21, 2019 (EP) .................................... 19192763

(51) Int. Cl.
*B26B 19/38* (2006.01)
*A46B 5/00* (2006.01)
(Continued)

(52) U.S. Cl.
CPC .......... *B26B 19/388* (2013.01); *A46B 5/0095* (2013.01); *A46B 7/04* (2013.01);
(Continued)

(58) Field of Classification Search
CPC ... B26B 19/04; B26B 19/3813; B26B 19/388; A46B 5/0095
(Continued)

(56) References Cited

U.S. PATENT DOCUMENTS 9,256,988 B2 2/2016 Wenger
10,412,209 B2 * 9/2019 Bron ................ H04M 1/72415
(Continued)

FOREIGN PATENT DOCUMENTS

JP 2002028383 A 1/2002
WO 2014/135589 A1 9/2014
WO 2018/192788 A1 10/2018

OTHER PUBLICATIONS

International Search Report and Written Opinion Dated Nov. 20, 2020 For International Application No. PCT/EP2020/072824 Filed Aug. 14, 2020.

*Primary Examiner* — Jason Daniel Prone

(57) ABSTRACT

A personal care device drive unit comprises a main body housing a motor and enabling releasable connection to any selected one of a set of different functional units. A controller of the personal care device drive unit generates an output signal associated with the selected one of the functional units connected to the main body in dependence on a sensed motor current and a sensed vibration occurring in the main body. The use of both vibration sensing and current sensing (which detects the electrical motor load resulting from driving the selected one of the functional units connected to the main body) enables multiple different functional units to be identified more reliably.

16 Claims, 6 Drawing Sheets

(51) Int. Cl.

| | |
|---|---|
| ***A46B 7/04*** | (2006.01) |
| ***A46B 15/00*** | (2006.01) |
| *B26B 19/04* | (2006.01) |
| *B26B 19/14* | (2006.01) |

(52) U.S. Cl.
CPC ...... *A46B 15/0004* (2013.01); *B26B 19/3813* (2013.01); *A46B 2200/104* (2013.01); *B26B 19/04* (2013.01); *B26B 19/14* (2013.01)

(58) Field of Classification Search
USPC ...................................................... 30/43.4–45
See application file for complete search history.

(56) References Cited

U.S. PATENT DOCUMENTS

| | | | | |
|---|---|---|---|---|
| 10,589,437 | B2 * | 3/2020 | Amavasai | B26B 19/388 |
| 10,946,539 | B2 * | 3/2021 | Nijdam | B26B 19/388 |
| 10,967,532 | B2 * | 4/2021 | Amavasai | B26B 19/388 |
| 11,806,884 | B2 * | 11/2023 | Eijkelkamp | B26B 19/388 |
| 2018/0168401 | A1 | 6/2018 | Weiss | |
| 2019/0224869 | A1 * | 7/2019 | Robinson | B26B 19/388 |
| 2019/0224870 | A1 * | 7/2019 | Robinson | B26B 19/388 |
| 2021/0186196 | A1 * | 6/2021 | Ogunsina | A46B 15/0006 |
| 2022/0048211 | A1 * | 2/2022 | Eijkelkamp | B26B 19/388 |
| 2022/0288800 | A1 * | 9/2022 | Hendriks | B26B 21/4056 |
| 2022/0331079 | A1 * | 10/2022 | Ogunsina | A46B 15/0006 |

* cited by examiner

PERSONAL CARE SYSTEM INCLUDING A PERSON CARE DEVICE DRIVE UNIT AND MULTIPLE FUNCTIONAL UNITS

CROSS REFERENCE TO RELATED APPLICATIONS

This application is the U.S. National Phase application under 35 U.S.C. § 371 of International Application No. PCT/EP2020/072824 filed Aug. 14, 2020, which claims the benefit of European Patent Application Number 19192763.1 filed Aug. 21, 2019. These applications are hereby incorporated by reference herein.

FIELD OF THE INVENTION

This invention relates to personal care systems, in particular having a set of different functional units which may be selectively attached to, and detached from, a shared main body.

BACKGROUND OF THE INVENTION

Modern personal care appliances such as shavers, hair trimmers, female depilation devices, etc. are often modular devices where different functional units can be selectively attached to a main body. Examples of such functional units are shaving units, trimmer modules, beard styler modules, (facial) cleaning brushes, etc.

Such devices are also becoming smarter in the sense that they allow different device settings and provide the user with status feedback via a user interface. For these functions to work optimally, it is often useful or even necessary to know which functional unit is currently attached to the main body.

This requires the functional unit to transfer information about its nature to the controller in the main body. Transferring such information is traditionally done using electrical or mechanical (micro) switches or even with advanced wireless communication techniques.

However, it is often not desirable to implement this approach, for example because there is insufficient space for the required components in the functional unit or in the main body, or because the electrical or mechanical connections cannot withstand the harsh environments they have to operate in (water, soap, etc.). Methods using wireless data communication (e.g. RFID) are expensive and often not possible due to limited possibilities for antenna placement.

The known methods are also not backwards compatible with existing functional units. They require modifications to the functional units, and will not be able to detect them if these modifications are not present.

There is therefore a need for a detection method which makes use of existing features of the functional units, does not require many additional parts, is robust enough to operate in wet or dirty environments, and allows to reliably identify a relatively large number of different functional units.

WO 2018/192788 discloses a personal care device in which a treatment head may be identified based on the motor current drawn resulting from the use of the treatment head. However, this may not give accurate results and hence not enable reliable identification if there is a significant number of treatment heads, for example with similar motor current characteristics.

WO 2014/135589 A1 discloses a dental apparatus comprising a gripping body, a treatment head coupled to the gripping body, and an acceleration sensor arranged in the main body for measuring an acceleration of the gripping body. The apparatus further has a control unit which is adapted to control the treatment head on the basis of the acceleration measured by the acceleration sensor. In particular the controller compares a motion sequence measured by the acceleration sensor with a predefined motion sequence which is associated with a predefined command. When the measured motion sequence matches the predefined motion sequence, the controller controls the treatment head based on said predefined command. Thus, a user of the dental apparatus may operate the dental apparatus by moving the gripping body according to the predefined motion sequence. In an example, the treatment head has a light guide which guides the light generated by a light diode into the mouth, and the user may switch the intensity of the generated light by typing an operating force with the fingertip onto the surface of e gripping body.

SUMMARY OF THE INVENTION

The invention is defined by the claims.

According to examples in accordance with an aspect of the invention, there is provided a personal care device drive unit, comprising:

a main body;

a motor arranged in the main body;

a connection interface arranged on the main body, adapted to enable connection of any selected one of a set of different functional units to the main body so as to enable driving of a movable functional component of the selected one of the set of different functional units by the motor;

a current sensor for measuring at least one current parameter relating to an electric current driving the motor;

a vibration sensor arranged in the main body for measuring at least one vibration parameter relating to a vibration of the main body during driving of the selected one of the set of different functional units when connected to the main body; and a controller, wherein the controller is adapted to generate an output signal associated with the selected one of the set of different functional units in dependence on a value of the at least one current parameter measured by the current sensor and a value of the at least one vibration parameter measured by the vibration sensor.

The personal care device drive unit according to the invention uses vibration sensing and motor current sensing to generate an output which is associated with a selected one of the different functional units. The functional units are for example personal care accessories for attachment to the main body. The output signal is "associated with" the selected (i.e. connected) functional unit in that the output signal is selected as one which is relevant to that particular functional unit. It may be a control signal for controlling the functional unit in a particular way, or for controlling another component, e.g. an output device, to present information relating to the functional unit. For example, the output signal may control a display to make the display provide identification of the identified functional component, or it may make the display present a set of options to a user relating to that functional unit. By generating the output signal associated with the selected one of the set of different functional units in dependence on the value of the at least one current parameter measured by the current sensor and the value of the at least one vibration parameter measured by the vibration sensor, the controller of the personal care device drive unit is adapted to identify, out of the set of different functional units, the selected one of the set of different functional units actually connected to the main body of the personal care device drive unit based on both the measured value of the at least one current parameter and the measured value of the at least one vibration parameter. The output signal may then automatically control the identified functional unit to be driven, by the motor, in a suitable way.

The use of both vibration sensing and current sensing (which detects the electrical load resulting from the functional unit) enables multiple different functional units to be identified. In particular, some units may use a rotary motion, and therefore induce only a small (or no) amount of vibration. Other functional units may use a reciprocating movement, so that vibrations are induced. By taking account of both vibration and motor drive current (i.e. the load seen by the motor), it is possible to distinguish between different functional units even if they cause the same type of vibration (as long as the current is different) or if they result in the same motor current (as long as the vibration characteristics are different). Thus, by providing two degrees of freedom in the sensing process, the detection accuracy can be greatly improved.

The controller may comprise a memory adapted to store a plurality of data sets, wherein:

each data set of the plurality of data sets is associated with a respective one of the set of different functional units; and the controller is adapted to select a data set from the plurality of data sets in dependence on the measured value of the at least one current parameter and the measured value of the at least one vibration parameter, and to generate the output signal such that the output signal relates to the selected data set.

In this way, a data set is associated with each functional unit, and the data set is selected based on which functional unit has been identified as being connected to the main body.

The personal care device drive unit may further comprise a speed feedback control system adapted to control a drive speed of the motor.

By controlling the motor drive speed with an accurate speed feedback control system, vibrations caused by the motor itself (for example from slight imbalance) will give rise to known vibration parameters, which can then be filtered or ignored as not relating to a connected functional unit. Additionally, vibrating functional units that vibrate with frequencies close to each other are also better distinguishable.

The speed feedback control system is for example adapted to implement speed control of the motor resulting in a deviation of the drive speed of the motor of less than 1% from a target drive speed.

The more accurate the motor drive speed, the more accurately vibrations caused by the motor itself may be identified, and therefore not considered to relate to the connected functional unit.

The speed feedback control system is for example adapted to generate a motor speed feedback signal from the measured value of the at least one current parameter, and wherein the speed feedback control system comprises a PI controller for processing a difference between the motor speed feedback signal and the target drive speed.

The use of the motor drive current to derive the motor speed avoids the need for additional feedback sensors. The PI controller enables the required accurate control of the motor drive speed.

The controller may be adapted to:

start the motor with default motor drive characteristics; and a predetermined time period after starting of the motor, generate the output signal associated with the selected one of the set of different functional units in dependence on the measured value of the at least one current parameter and the measured value of the at least one vibration parameter.

This predetermined time period allows the motor drive current to stabilize. The initial actuation of the motor is for example based on a generic drive type which can be applied safely to any functional unit. This initial actuation is thus with default motor drive characteristics. Once the functional unit has been identified, the output signal is generated. This may for example relate to a drive scheme which is specific to the particular functional unit. The predetermined time may for example be 1 second or less, for example 500 ms or less, but typically at least 250 ms.

The time period is for example sufficiently short that the output signal is generated before the functional unit is actually brought into contact with the user. Thus, before the functional unit is actually used, the output signal is generated, for automatic control or for presenting relevant options or information to the user.

The output signal associated with the selected one of the set of different functional units is for example associated with predefined motor drive characteristics associated with the selected one of the set of different functional units.

Thus, the output signal relates to the drive characteristics which are suitable for the connected functional unit. This may then enable automatic control of the functional unit, without needing any input from the user of the personal care device drive unit.

The vibration sensor for example comprises an accelerometer.

This is a low cost component able to generate the required vibration information. It may comprise a three-axis accelerometer. The at least one vibration parameter may comprise one or both of a vibration frequency and a vibration amplitude. These are both possible identifying characteristics for vibrations caused by a connected functional unit. If both parameters are used, better discrimination between different vibration sources may be possible.

The controller is for example adapted to determine whether a maximum vibration amplitude occurring within a predefined range of vibration frequencies is above a predefined threshold value. Thus, the controller may seek to identify a vibration with a characteristic amplitude within a certain frequency band. In general, the controller may be adapted to compare the measured value of the at least one vibration parameter with at least a first value of the at least one vibration parameter associated with a vibration of the main body caused by the driving of a first selected one of the set of different functional units when connected to the main body, and with a second value of the at least one vibration parameter associated with a vibration of the main body caused by the driving of a second selected one of the set of different functional units when connected to the main body.

The invention also provides a personal care system comprising a personal care device drive unit as defined above and a set of different functional units each being releasably connectable to the connection interface of the personal care device drive unit i.e. the main body of the personal care device drive unit and each comprising a movable functional component.

The set of different functional units may comprise at least a first and a second functional unit, each comprising a functional component configured to perform a reciprocating motion, and at least a third and a fourth functional unit, each comprising a functional component configured to perform a rotating motion in a single direction.

The first and the second functional units are then associated with the occurrence in the main body of a maximum vibration amplitude above, respectively, a first and a second predefined threshold value in, respectively, mutually different first and second predefined ranges of vibration frequencies, and the third and fourth functional units are then associated with the occurrence of a value of the at least one current parameter in, respectively, mutually different first and second predefined ranges of the at least one current parameter.

The controller is then adapted to generate, in a first step, an output signal associated with the first or the second functional unit when a maximum vibration amplitude occurring within, respectively, the first or the second predefined range of vibration frequencies is above, respectively, the first or the second predefined threshold value. The controller is then further adapted to generate, in a second step following the first step, an output signal associated with the third or the fourth functional unit when the value of the at least one current parameter is in, respectively, said first or said second predefined range of the at least one current parameter.

At least two of the functional units of the set thus use rotation and therefore do not give rise to large vibration signals, and at least two others use reciprocating motion which do give rise to vibrations. The personal care device drive unit is able to distinguish between all of the different types of functional unit and thereby provide suitable output signals, for example relating to motor control, for each type of functional unit.

It may suffice only to measure the vibration amplitude for identification of the first and second functional units, because they each have unique vibration characteristics. This reduces the amount of processing. Thus, the two measurements (current and vibration) may not always be needed, but the system has the capability of performing both measurements, and both are used to cover the whole set of functional units.

The set of different functional units for example comprises at least a rotary-type shaving unit, a reciprocating-type precision hair trimmer, a rotary-type facial brushing unit, and a reciprocating-type beard styler.

This is one example of a hair treatment personal care system with (at least) four different functional units.

More generally, the set of different functional units may comprise at least two of a shaving unit, a facial brushing unit, a beard styler and a precision hair trimmer. In this more general system configuration, there are at least two functional units, again in this example relating to hair treatment. In other examples, the system may be for depilation, or even for dental care.

The invention also provides a method of controlling a functional unit connected to a main body of a personal care system, the personal care system comprising said main body, a motor arranged in the main body, a set of different functional units each being releasably connectable to the main body and each comprising a movable functional component, and a connection interface arranged on the main body and adapted to enable connection of any selected one of the set of different functional units to the main body so as to enable driving of the movable functional component thereof by the motor, wherein the method comprises:

- measuring at least one current parameter relating to an electric current driving the motor;
- measuring at least one vibration parameter relating to a vibration of the main body during driving of the selected one of the set of different functional units when connected to the main body; and
- performing an output function associated with the selected one of the set of different functional units in dependence on a measured value of the at least one current parameter and a measured value of the at least one vibration parameter.

This is the method implemented by the personal care device drive unit and the personal care system defined above. The method may further comprise controlling a drive speed of the motor with a deviation of less than 1% from a target drive speed.

This makes the measurement of the at least one vibration parameter more robust.

The method of the invention may be implemented, at least in part, in software.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
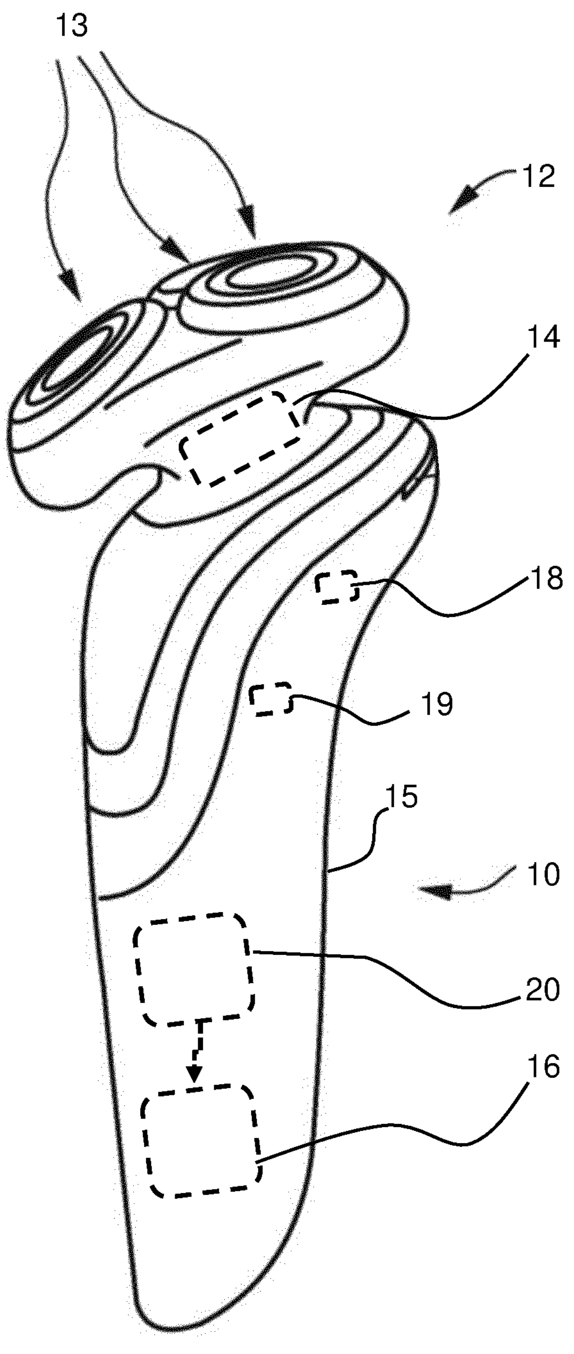
FIG. 1 shows a personal care system in the form of a shaver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a personal care device drive unit, comprising a main body housing a motor, wherein a set of different functional units is each releasably connectable to the main body. A controller generates an output signal associated with a connected functional units in dependence on sensed current and a sensed vibration. The use of both vibration sensing and current sensing (which detects the electrical load resulting from the functional unit) enables multiple different functional units to be identified more reliably.

FIG. 1 shows a personal care system 10 in the form of a shaver.

The shaver comprises a functional unit 12, in particular a shaver head, releasably connected to a main body 15 (in this example the handle) via a connection interface 14. The main body, including the components accommodated within the main body is referred to in this document as the personal care device drive unit. The shaver head has a movable functional component, in this example a set of three rotary cutters 13. A motor 16 is arranged in the main body to enable driving of the movable functional component by the motor. The shaver head is just one of a set of functional units which may be connected to the main body.

A current sensor 18 is provided for measuring at least one current parameter relating to an electric current driving the motor and a vibration sensor 19 is arranged in the main body for measuring at least one vibration parameter relating to a vibration of the main body 15 during driving of the shaver head.

The current sensor 18 measures the electrical current that flows to the electrical motor 16 which drives the functional unit. The motor is typically mounted in the main body, e.g. in the handle, and the functional unit is connected to it via a rotating or translating mechanical interface. The motor current is typically an important parameter for the electronics and/or software controlling the motor, so this information is usually already available. The sensor can simply comprise a resistor, for example a surface mount component. The voltage is measured and is proportional to the current.

The vibration sensor measures mechanical vibrations of, or within, the main body. This may be implemented as an accelerometer such as a surface mount device, which is a small and inexpensive component that can be added to the main printed circuit board. In some cases, e.g. in appliances where the user interface is automatically activated upon pickup of the appliance, such accelerometers are already present and can thus be used. The position on the PCB will influence the vibration level detected. Preferably, the accelerometer is placed at a position whereby the vibration of the functional units are readily picked up.

A controller 20 generates an output signal associated with the connected functional component, i.e. the shaver head in this case, dependence on a value of the at least one current parameter measured by the current sensor and a value of the at least one vibration parameter measured by the vibration sensor.

The personal care device drive unit thus uses vibration sensing and motor current sensing to generate an output which is associated with a selected one of the different functional units. The output signal is “associated with” the connected functional unit in that the output signal is selected as relevant to, or used by, that particular functional unit. The use of both vibration sensing and current sensing (which detects the electrical load resulting from the functional unit) enables multiple different functional units to be identified. In particular, some units may use a rotary motion, and therefore induce only a small (or no) amount of vibration. Other functional units may use a reciprocating movement, so that vibrations are induced.

Figure 2:
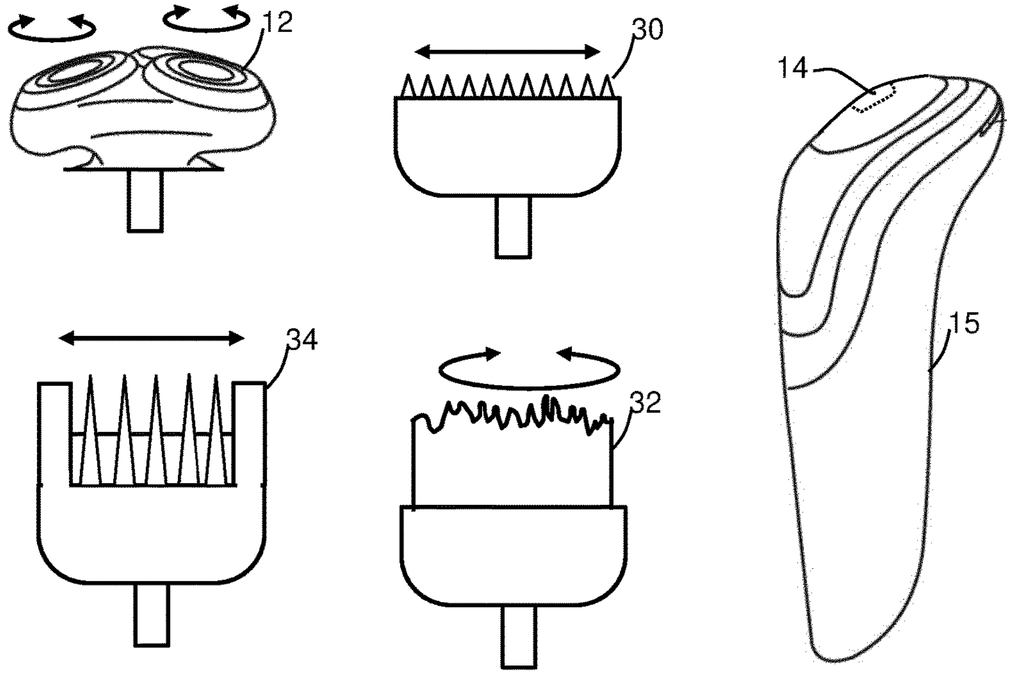
FIG. 2 shows the main body of the personal care system (which, including the components contained within the main body, may be defined as a personal care device drive unit) together with an associated set of functional units.

FIG. 2 shows the main body 15 of the personal care device drive unit, together with an associated set of functional units, each of which may be releasably connected to the main body. The functional units comprise a rotary-type shaving unit 12, a reciprocating-type precision hair trimmer 30, a rotary-type facial brushing unit 32, and a reciprocating-type beard styler 34. Each has a connection interface for cooperating with the connection interface 14 of the main body. This is one example of a hair treatment personal care system with (at least) four different functional units. More generally, the set of different functional units may comprise at least two of the different types shown.

When the personal care device drive unit is switched on, the motor speed will increase until it reaches a steady state level. Before this steady state level is reached, the current and accelerometer readings are not stable. A sufficiently stable signal can for example be obtained after a delay period, for example of between 250 ms and 500 ms. Therefore, the current sensor and accelerometer signals used to determine the output signal are for example obtained within a time period from 250 ms to 500 ms after switching on until a maximum delay for example of 1 second. Preferably, the collection and analysis of the sensor signals takes place before the user starts using the appliance.

The current sensor signal may be filtered in hardware and/or software. In software, the average current is determined starting after the delay period and for a time window for example of up to 250 ms.

The accelerometer signal may for example be sampled for example at around 1 kHz, for example at 1600 Hz. The signals of interest are vibration signals and not accelerations caused by gravity or other slow movements of the user moving the handle, so the accelerometer signal is filtered with a Band Pass or High Pass filter, for example with a a low cut-off frequency of about 30 Hz. The high cut-off frequency for a band pass filter may for example be around 200 Hz. The accelerometer is for example a 3-axis device.

The different functional units have different current and vibrational characteristics.

Figure 3:
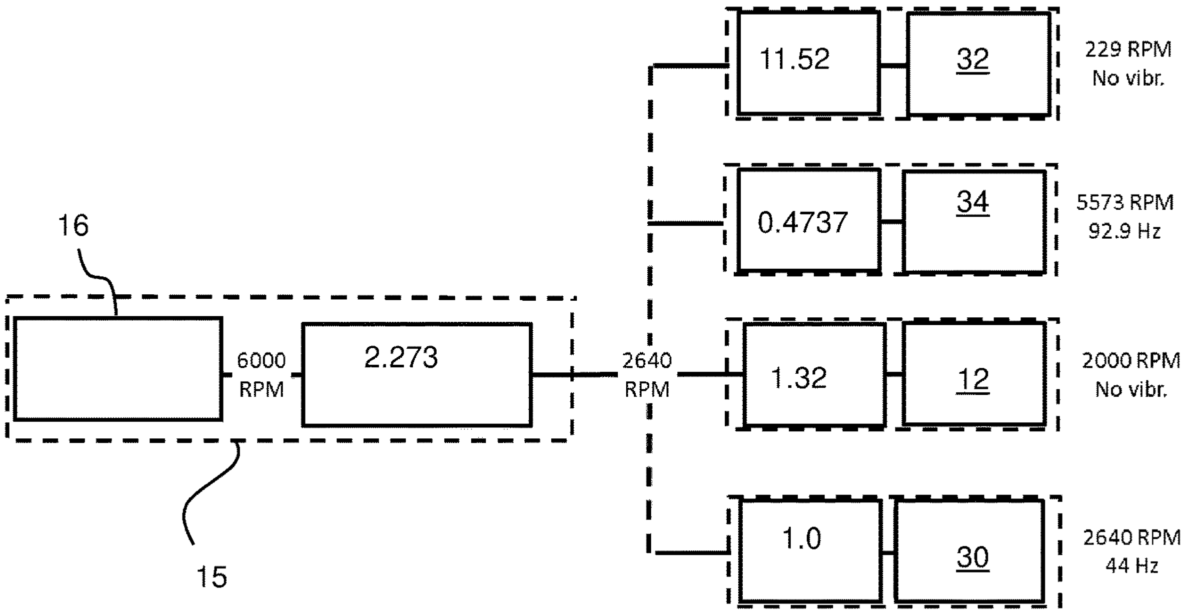
FIG. 3 shows an example of the possible rotational characteristics of the functional units.

FIG. 3 shows an example of the possible rotational characteristics. The motor 16 is shown with a 6000 rpm rotor rotation speed. An output gear train has a step down gear ratio of 2.273 giving a rotation speed of 2640 rpm at the output shaft of the motor.

Each functional unit has a different gear train, giving a rotational coupling ratio. The shaving unit 12 has a step down ratio of 1.32 giving a 2000 rpm rotation with no (or minimal) vibration. The precision trimmer 30 has a ratio of 1.0 giving a 2640 rpm reciprocal motion, giving a strong vibration signal at the corresponding frequency of 44 Hz. The rotary brush 32 has a step down ratio of 11.52 giving a 229 rpm rotation with no (or minimal) vibration. The beard styler unit 34 has a step down ratio of 0.437 giving a 5573 rpm reciprocal motion, giving a strong vibration signal at the corresponding frequency of 92.9 Hz.

There are only two vibrating functional units in this example. These are the beard styler and the precision trimmer. The shaving unit and the brush are rotating systems. Therefore, no vibration frequency is expected from those two functional units.

If feedforward control is used to control the motor speed, a deviation of +/−10% with respect to the target speed can be expected. This deviation reflects directly on the expected vibration frequency. With this level of tolerance, the precision trimmer frequency may lie in the range 39.6 Hz to 48.4 Hz and the beard styler frequency may lie in the range 83.6 Hz to 102 Hz.

Figure 4:
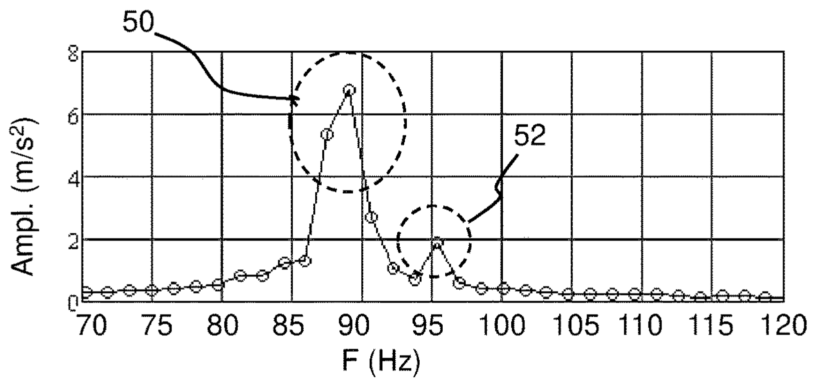
FIG. 4 shows the frequency spectrum of the accelerometer x-axis signal for a beard styler connected to the handle.

FIG. 4 shows the frequency spectrum obtained by performing an FFT (Fast Fourier Transform) on the accelerometer x-axis signal (which is the dominant vibration axis) for a beard styler connected to the handle.

FIG. 4 shows that within the frequency window where the beard styler signal is expected, there is an amplitude peak 50. This indicates that must be a beard styler attached. However, FIG. 4 also shows an amplitude spike caused by the imbalance of the motor, at around 100 Hz (corresponding to 6000 rpm). This frequency is in the same general frequency window as the beard styler signal. In some cases the amplitude of the imbalance frequency can be sufficiently high that it appears that a beard styler is attached to the handle while actually a shaving unit is attached. This would result in a misclassification.

Figure 5:
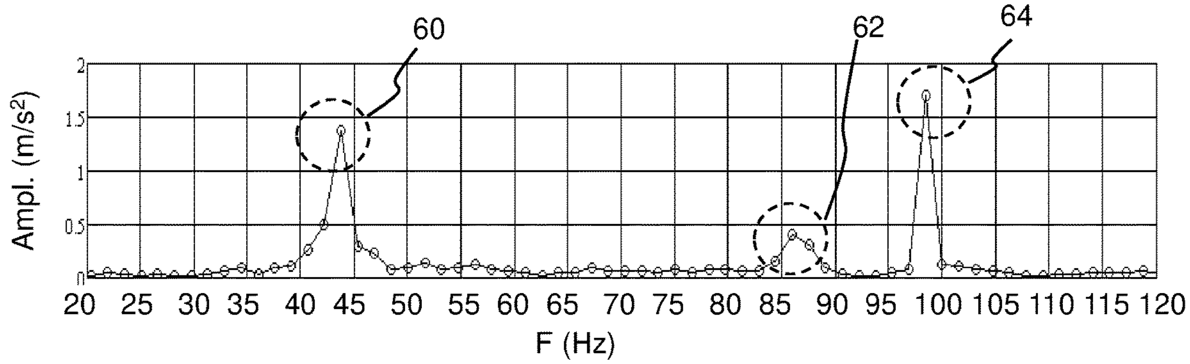
FIG. 5 shows the frequency spectrum of the accelerometer x-axis signal for a precision trimmer attached to the handle.

This motor imbalance problem is even more pronounced in the FIG. 5. The frequency spectrum is again shown based on an FFT of the accelerometer x-axis signal with a precision trimmer attached to the handle.

In this case it is not clear what is attached to the handle since in both the expected frequency window of the beard styler and the frequency window of the precision trimmer a large amplitude peak is seen. Peak 60 is in the precision trimmer window and peaks 62 and 64 are both in the general window where the beard styler signal is expected. Peak 62 is the second harmonic frequency of the precision trimmer. For example, peak 60 is at 43.5 Hz and peak 62 is at 87 Hz, with a lower amplitude that the first harmonic peak 60. The peak 64 is the motor imbalance peak. This also can result in a misclassification.

For robustness enhancement, the motor can have the speed controlled more accurately using a feedback approach. For this purpose, a digital algorithm or analogue system may be used to measure the motor speed and a digital or analogue system is used to control the motor speed accurately using feedback control.

Figure 6:
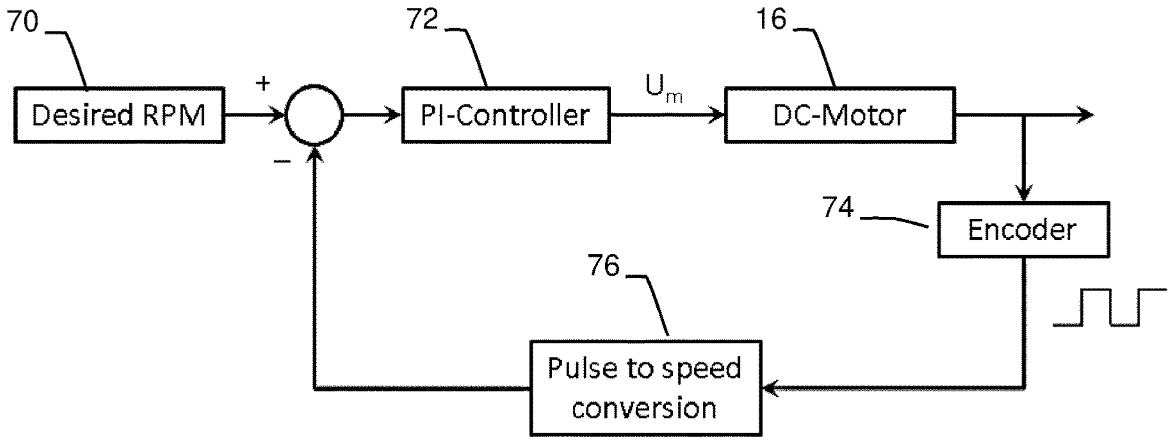
FIG. 6 shows an example of a possible speed feedback control system.

FIG. 6 shows an example of a possible speed feedback control system. It means that vibrations caused by the motor itself (for example from slight imbalance) will give rise to known vibration parameters, which can then be filtered or ignored as not relating to a connected functional unit. Additionally, vibrating functional units that vibrate with frequencies close to each other are also better distinguishable. The speed feedback control system for example controls the motor speed with a deviation of less than 1% from a target drive speed.

A desired motor speed 70 is provided as input. It is compared with a feedback signal, and the difference is provided to a PI (proportional-integral) controller 72. The control output is the drive signal Um for the motor 16. The motor speed is detected by an encoder 74, and the encoder pulses are converted to a feedback speed signal by a pulse to speed conversion unit 76. The detection by the encoder may in fact be based on the motor current (i.e. the at least one current parameter). The motor drive current can thus be used to derive the motor speed, thereby avoiding the need for additional feedback sensors.

The speed feedback control system avoids the need for the inherent balance of the motor to be improved by means of an expensive design. Such a design would also need to include the surrounding components such as the motor frame.

Figure 7:
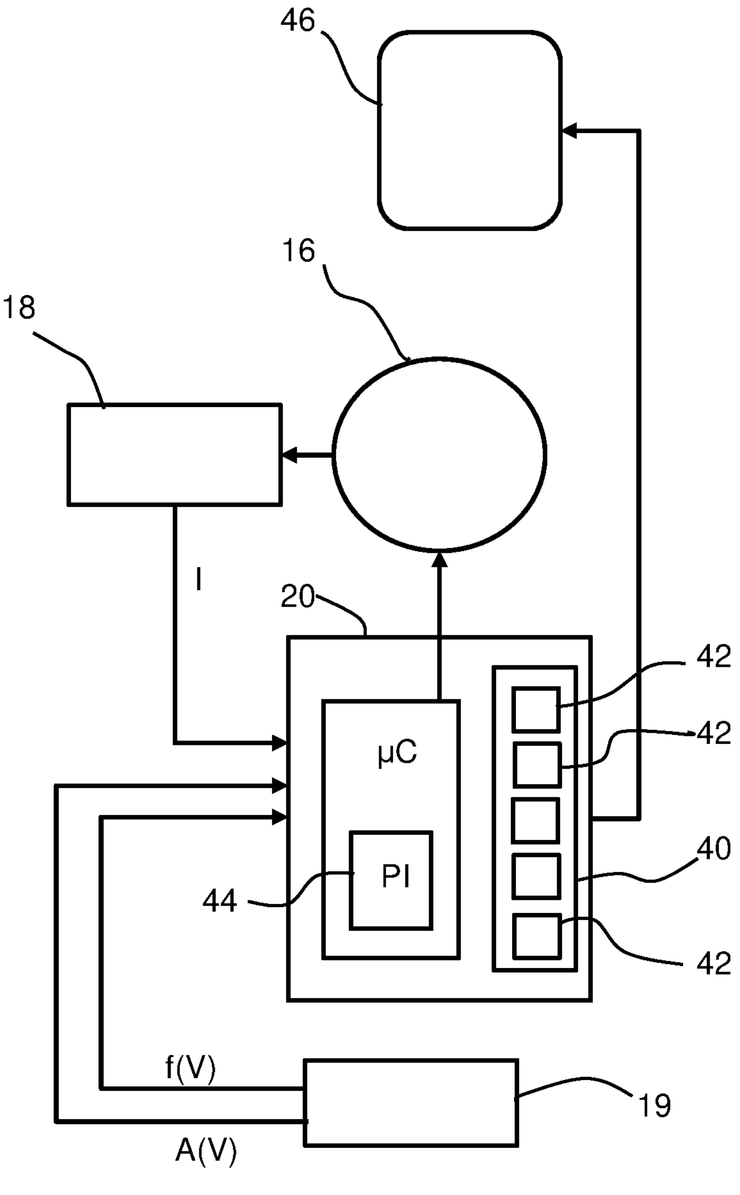
FIG. 7 shows the resulting components of the personal care device drive unit.

By controlling the deviation on the motor speed to be +/−1%, the frequency window for the beard styler example would become 91.97 Hz to 93.83 Hz. If the target speed of the motor is 6000 rpm, the imbalance frequency is at 100 Hz (+/−1%). In that case the imbalance frequency falls out of the required detection window for the beard styler and misclassification can be avoided FIG. 7 shows the resulting components of the personal care device drive unit. Already described above are the motor 16, current sensor 18, vibration sensor 19 (i.e. accelerometer) and controller 20.

FIG. 7 shows that the controller 20 comprises a memory 40 which stores a plurality of data sets 42. Each data set of the plurality of data sets is associated with a respective one of the set of different functional units. The controller 20 selects a data set from the plurality of data sets 42 in dependence on the measured current and vibration values and then an output signal is generated based on the selected data set.

FIG. 7 also shows that the controller 20 includes a PI control algorithm 44. It also shows an output display 46.

The output signal generated by the controller 20 may be used to control the motor 16 and/or to control the display 46. Both are shown in FIG. 7. Other output devices may of course be used.

A preferred implementation has automatic control of the identified functional unit, for example a preferred motor speed, or variation of motor speed over time. Thus, once a functional unit is identified, it may be desired not to maintain the motor speed at 6000 rpm, but to implement a time-varying motor speed profile.

The initial operation at 6000 rpm (for example) may be considered to be a generic operation mode which can be applied safely to any functional unit. The initial actuation of the motor is thus with default motor drive characteristics. Once the functional unit has been identified, the output signal is generated. This may for example relate to a drive scheme which is specific to the particular functional unit.

Figure 8:
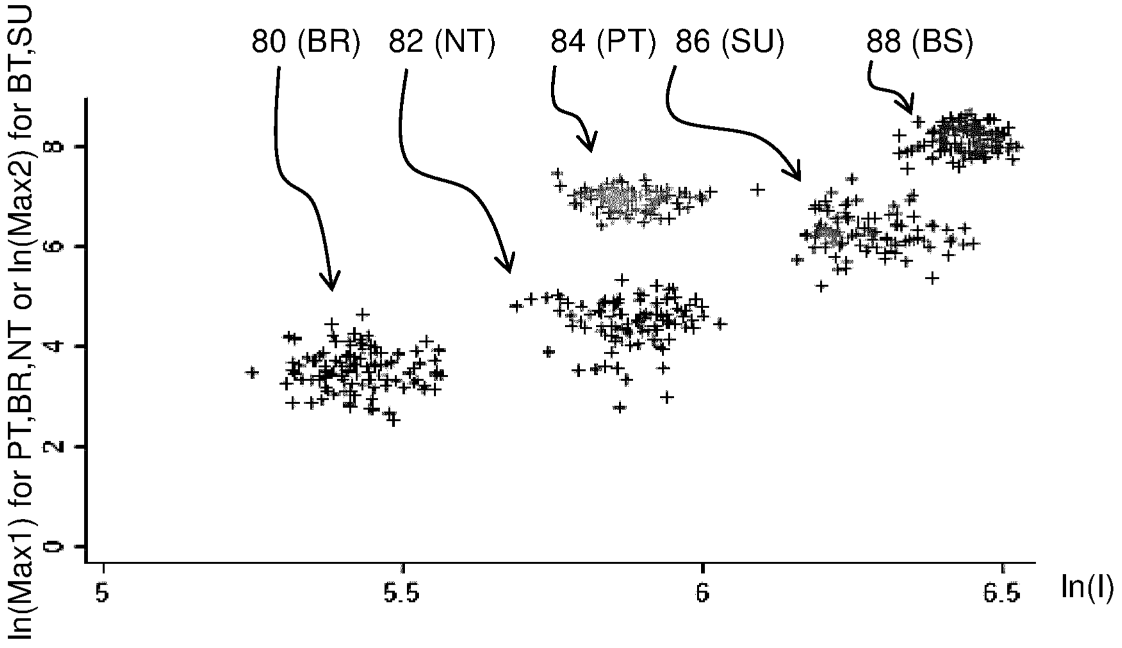
FIG. 8 shows a series of measurements using different handles (of the same type) and using different functional units.

FIG. 8 shows a series of measurements using different handles (of the same type) and using different functional units. The measurements are gathered using feedforward control. This gives about +/−10% deviation on the speed. Thus, the clustering will be even better when the feedback speed control is used.

The x-axis plots the natural logarithm of the average current measured. The y-axis plots the natural logarithm of Max1 and Max2. Max1 is the maximum amplitude found in the frequency window where the precision trimmer (PT) and nose trimmer (NT) is expected. Max2 is the maximum amplitude found in the frequency window where the beard styler (BS) is expected.

Region 80 relates to the shaving brush (BR), region 82 relates to a nose trimmer (NT), region 84 relates to the precision trimmer (PT), region 86 relates to the shaving unit and region 88 relates to the beard styler (BS).

In one example, the set of functional units comprises a brush, precision trimmer, shaving unit and beard styler. In such a case, the set of different functional units comprises a first (precision trimmer) and a second (beard styler) functional unit, each comprising a functional component (e.g. blade) configured to perform a reciprocating motion, and at least a third (shaving unit) and a fourth (brush) functional unit, each comprising a functional component (e.g. cutter disk or bristle head) configured to perform a rotating motion in a single direction.

The first and the second functional units are then associated with the occurrence in the main body of a maximum vibration amplitude above, respectively, a first and a second predefined threshold value in, respectively, mutually different first and second predefined ranges of vibration frequencies. Thus, they vibrate at different frequencies with their own characteristic amplitude. The third and fourth functional units are associated with the occurrence of a value of the at least one current parameter in, respectively, mutually different first and second predefined ranges of the at least one current parameter. Thus, they result in characteristic load current for the driving motor.

In such a case, it is sufficient to check if a large enough vibration amplitude is found in one of the two frequency windows in order to identify the first and second functional units. The controller thus determines whether a maximum vibration amplitude occurring within a predefined range of vibration frequencies is above a predefined threshold value. Thus, the controller may seek to identify a vibration with a characteristic amplitude within a certain frequency band.

In this way, the controller generates, in a first step, an output signal associated with the first or the second functional unit when a maximum vibration amplitude occurring within, respectively, the first or the second predefined range of vibration frequencies is above, respectively, the first or the second predefined threshold value. In this example, if the required amplitude was reached in the frequency window where the precision trimmer is expected, the functional unit must be a precision trimmer. If this was in the frequency window where the beard styler is expected, the functional unit must be a beard styler.

If the vibration amplitude in both frequency windows is not high enough (not higher than the expected threshold) then a brush or a shaving unit must be attached. In that case those two can be distinguished by looking at the average current level. Below a certain current threshold it must be the brush, above this threshold it must be the shaving unit.

The controller thus generates, in a second step following the first step, a control signal associated with the third or the fourth functional unit when the value of the at least one current parameter is in, respectively, said first or said second predefined range of the at least one current parameter.

A simple switch may be used to detect whether or not any functional unit is attached.

Figure 9:
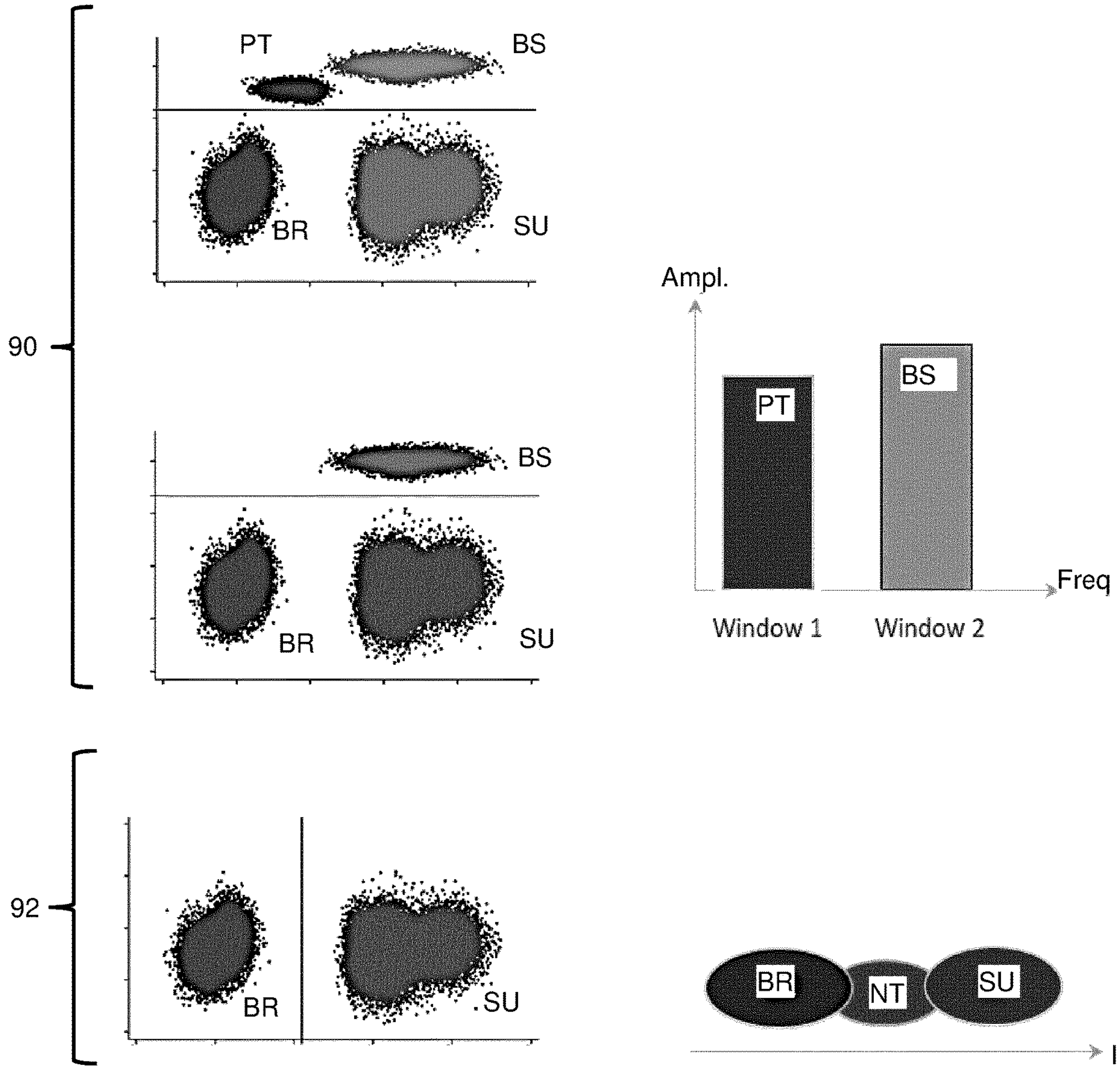
FIG. 9 shows a two-step measurement approach graphically.

FIG. 9 shows this two-step approach graphically.

The first step is shown as 90. The vibration amplitude is measured in the two frequency windows, as shown in the graph. The first measurement identifies whether or not a precision trimmer (PT) is present, and the second measurement identifies whether or not a beard styler (BS) is present.

The second step is shown as step 92. The average current is used to distinguish between the brush (BR) and shaving unit (SU) (and optionally also a nose trimmer NT, as shown, in the case that frequency determination alone is not sufficient).

The invention may be applied to personal care systems other than shaving systems. For example it may be applied to other hair care systems such as epilator systems, or even to oral healthcare modular systems.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to".

Any reference signs in the claims should not be construed as limiting the scope.

The invention claimed is:

1. A personal care system, comprising:

a personal care device drive unit; and a plurality of functional units connectable to the personal care device drive unit, wherein the plurality of functional units are different types of personal care accessories, respectively, for performing different types of personal care of a user, wherein each functional unit of the plurality of functional units comprises a movable functional component configured for rotating motion or reciprocating motion, wherein one functional unit of the plurality of functional units is connectable to the personal care device drive unit at a time, and wherein the personal care device drive unit comprises:

a main body;

a motor arranged in the main body;

a connection interface arranged on the main body and configured to releasably connect any functional unit of the plurality of functional units to the main body and to enable driving of the movable functional component of the connected functional unit by the motor via an output shaft;

a current sensor arranged in the main body for measuring an electric current of the motor caused by the motor driving the connected functional unit via the connection interface;

a vibration sensor arranged in the main body for measuring a vibration of the main body caused by the motor driving the connected functional unit via the connection interface; and a controller arranged in the main body and configured to identify the connected functional unit from the measured electric current measured by the current sensor and the measured vibration measured by the vibration sensor, and to generate an output signal indicating the connected functional unit.

2. The personal care system as claimed in claim 1, wherein:

the controller comprises a memory adapted to store a plurality of data sets, wherein the plurality of data sets correspond to the plurality of functional units, respectively; and the controller is configured to select a data set from the plurality of data sets in dependence on the measured electric current and the measured vibration, and to generate the output signal to control the connected functional unit to be driven by the motor in accordance with the selected data set.

3. The personal care system as claimed in claim 2, wherein the different types of functional units include two or more of a rotary-type shaving unit, a rotary-type brushing unit, a reciprocating-type beard styler and a reciprocating-type hair trimmer.

4. The personal care system as claimed in claim 1, wherein the personal care device drive unit further comprises:

a speed feedback control system arranged in the main body and configured to control a drive speed of the motor to approach a target drive speed of the motor desired for operation of the connected functional unit.

5. The personal care system as claimed in claim 4, wherein the speed feedback control system controls the drive speed of the motor to deviate less than 1% from the target drive speed.

6. The personal care system as claimed in claim 5, wherein the target drive speed of the motor is 6000 rpm.

7. The personal care system as claimed in claim 4, wherein the speed feedback control system comprises:

an encoder configured to detect a speed of the motor in response to a drive signal;

a pulse to speed converter configured to convert encoder pulses from the encoder indicating the detected speed of the motor to a feedback speed signal;

a comparator configured to determine a difference between the feedback speed signal and the target drive speed of the motor; and a proportional-integral (PI) controller configured to adjust the drive signal using the determined difference between the feedback speed signal and the target drive speed.

8. The personal care system as claimed in claim 7, wherein the encoder is configured to detect the speed of the motor using the measured electric current.

9. The personal care system as claimed in claim 1, wherein the controller is further configured to:

initially drive the motor to operate in accordance with default motor drive characteristics in a generic operation mode; and a predetermined time period after the motor operating in the generic operation mode, generate the output signal corresponding to the connected functional unit in dependence on the measured electric current and the measured vibration, and drive the motor to operate in accordance with the output signal.

10. The personal care system as claimed in claim 1, wherein the output signal indicating the connected functional unit further indicates predefined motor drive characteristics for driving the connected functional unit.

11. The personal care system as claimed in claim 1, wherein the vibration sensor comprises an accelerometer.

12. The personal care system as claimed in claim 11, wherein the measured vibration comprises one or both of a vibration frequency and a vibration amplitude.

13. The personal care system as claimed in claim 12, wherein the controller is adapted to determine whether a maximum vibration amplitude occurring within a predefined range of vibration frequencies is above a predefined threshold value.

14. The personal care system as claimed in claim 1, wherein:

the plurality of functional units comprises at least a first functional unit, a second functional unit, a third functional unit, and a fourth functional unit, wherein the movable functional component of each of the first and the second function units is configured to perform the reciprocating motion, and the movable functional component of each of the third and the fourth functions units is configured to perform the rotating motion in a single direction;

the measured vibration caused by driving the first and the second functional units in the main body includes a maximum vibration amplitude above, respectively, a first and a second predefined threshold value in, respectively, mutually different first and second predefined ranges of vibration frequencies;

the measured electric current caused by driving the third and the fourth functional units includes electric current in, respectively, mutually different first and second predefined ranges of the measured electric current;

the output signal generated by the controller indicates the first or the second functional unit as the connected functional unit when a measured maximum vibration amplitude occurs within, respectively, the first or the second predefined range of vibration frequencies is above, respectively, the first or the second predefined threshold value; and the output signal generated by the controller indicates the third or the fourth functional unit as the connected functional unit when the measured electric current is in, respectively, the first or the second predefined range of the measured electric current.

15. The personal care system as claimed in claim 14, wherein the plurality of functional units comprise at least a rotary-type shaving unit, a reciprocating-type hair trimmer, a rotary-type facial brushing unit, and a reciprocating-type beard styler.

16. The personal care system as claimed in claim 1, wherein the plurality of functional units comprises at least two of a rotary-type shaving unit, a rotary-type brushing unit, a reciprocating-type beard styler and a reciprocating-type hair trimmer.

* * * * *